(12) United States Patent
Nagashima

(10) Patent No.: US 6,188,491 B1
(45) Date of Patent: Feb. 13, 2001

(54) PRINTING SYSTEM, PRINTING APPARATUS AND PRINTING CONTROL METHOD

(75) Inventor: Takeyuki Nagashima, Tokyo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/160,075

(22) Filed: Sep. 25, 1998

(30) Foreign Application Priority Data

Sep. 30, 1997 (JP) .................................................. 9-267372

(51) Int. Cl.[7] .................................................. H04N 1/46
(52) U.S. Cl. .......................... 358/1.9; 358/298; 358/457; 358/535
(58) Field of Search .......................... 358/1.9, 298, 455, 358/456, 457, 534, 535, 536; 382/162

(56) References Cited

U.S. PATENT DOCUMENTS

| | | | |
|---|---|---|---|
| 5,416,612 | * 5/1995 | Ingraham et al. | 358/298 |
| 5,627,919 | 5/1997 | Kemmochi | 382/254 |
| 5,777,757 | * 7/1998 | Karlsson et al. | 358/456 |
| 5,903,713 | * 5/1999 | Daels et al. | 358/1.9 |
| 5,995,713 | * 11/1999 | Lee | 358/1.5 |

* cited by examiner

*Primary Examiner*—Thomas D. Lee
(74) *Attorney, Agent, or Firm*—Fitzpatrick, Cella, Harper & Scinto

(57) ABSTRACT

A printing control system is composed of a computer and a printing apparatus connected via a communication line. The computer forms a dither matrix, which is employed in binarization processing to deal with misregistration of color planes, by rotating a reference dither matrix through a predetermined angle in dependence upon printing orientation and paper transport direction, and binarizes print data using the dither matrix that has been formed. Print data that has been corrected, by the computer, for misregistration of color planes is printed by the printing apparatus.

7 Claims, 7 Drawing Sheets

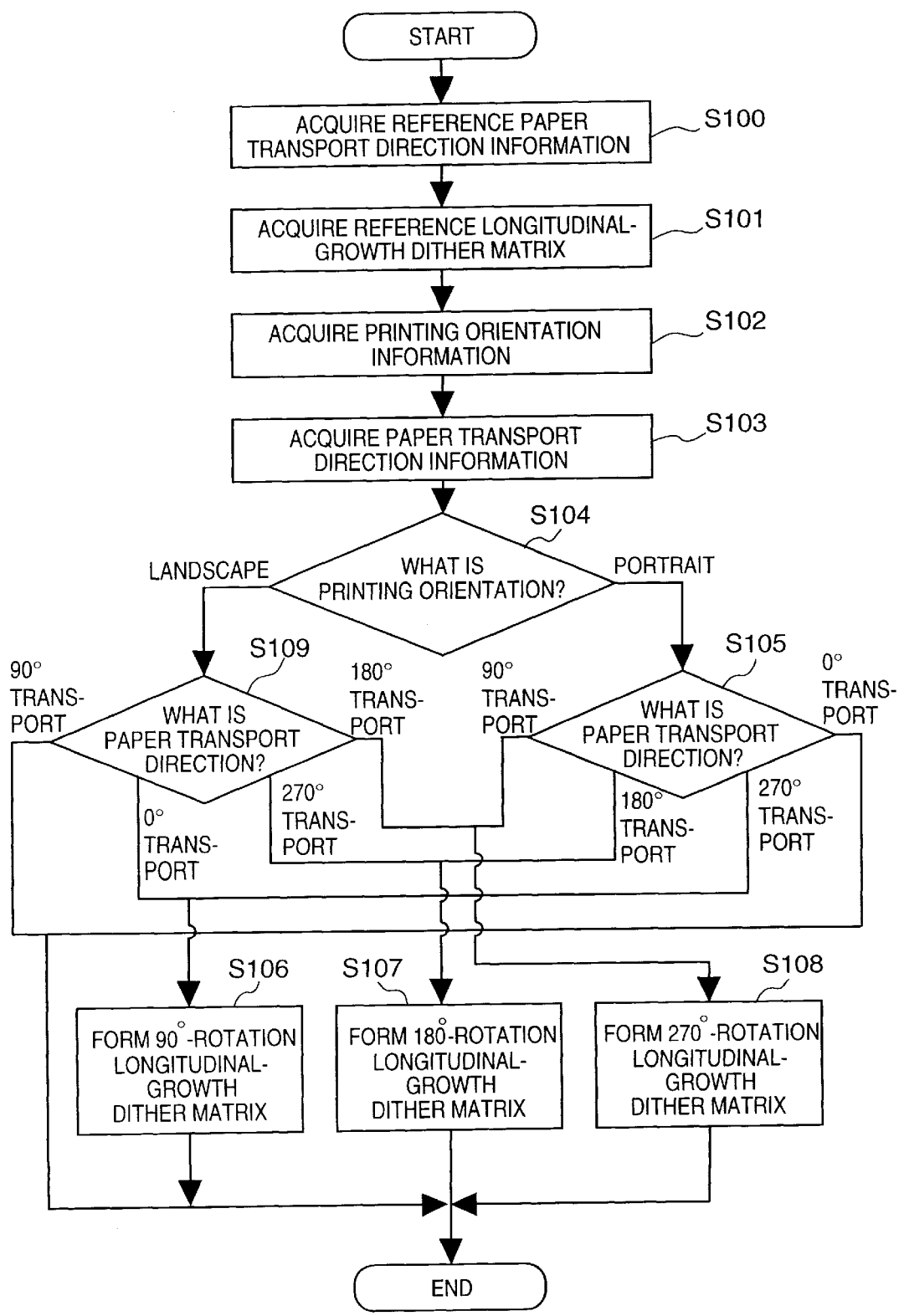

PRINTING SYSTEM, PRINTING APPARATUS AND PRINTING CONTROL METHOD

BACKGROUND OF THE INVENTION

This invention relates to a printing system, which is composed of a computer and a printing apparatus connected via a communication line, a printing apparatus and a printing control method.

A problem that can occur in a color printing apparatus is misregistration of color planes in an output image caused by the mechanisms for the printing and paper transport functions. In the prior art, this is dealt with by correcting the print data in the printer controller using a dither matrix that dots grow in longitudinal direction (hereinafter longitudinal-growth dither matrix).

Further, when data is binarized and transmitted to a printing apparatus by a client computer that processes the data, the computer corrects the print data using a longitudinal-growth dither matrix as the dither matrix used in binarization.

However, since the dither matrix used at the time of binarization processing in the printing apparatus or client computer in the above-described prior art is a unique longitudinal-growth dither matrix that corresponds to the printing orientation (portrait or landscape) and the direction in which the paper is transported, appropriate measures for dealing with misregistration cannot be implemented in regard to the orientation of the print data and the paper transport direction.

SUMMARY OF THE INVENTION

Accordingly, an object of the present invention is to provide a printing system, printing apparatus and printing control method whereby a dither matrix for dealing with misregistration of color planes can be formed in dependence upon printing orientation and paper transport direction.

Another object of the present invention is to perform high-quality printing by rotating a reference dither matrix through a predetermined angle in dependence upon printing orientation and paper transport direction to form a dither matrix for dealing with misregistration of color planes, and using this dither matrix in binarization processing.

According to the present invention, the foregoing object is attained by providing a printing system composed of a computer and a printing apparatus connected via a communication line, wherein the computer includes forming means for forming a dither matrix, which is employed in binarization processing to deal with misregistration of color planes, in dependence upon printing orientation and paper transport direction; and binarization means for binarizing print data using the dither matrix formed by the forming means; the printing apparatus printing print data that has been corrected, by the computer, for misregistration of color planes.

Further, according to the present invention, the foregoing object is attained by providing a printing apparatus comprising: forming means for forming a dither matrix, which is employed in binarization processing to deal with misregistration of color planes, in dependence upon printing orientation and paper transport direction; binarization means for binarizing print data using the dither matrix formed by the forming means; and printing means for printing print data that has been binarized by the binarization means.

Further, according to the present invention, the foregoing object is attained by providing a printing control method comprising: a forming step of forming a dither matrix, which is employed in binarization processing to deal with misregistration of color planes, in dependence upon printing orientation and paper transport direction; a binarization step of binarizing print data using the dither matrix formed by the forming step; and a printing control step of controlling printing of print data that has been binarized by the binarization step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a flowchart illustrating the details of dither matrix formation processing shown in FIG. 6.

DESCRIPTION OF THE PREFERRED EMBODIMENT

A preferred embodiment of the present invention will now be described in detail with reference to the drawings.

[Printing system configuration]

Figure 1:
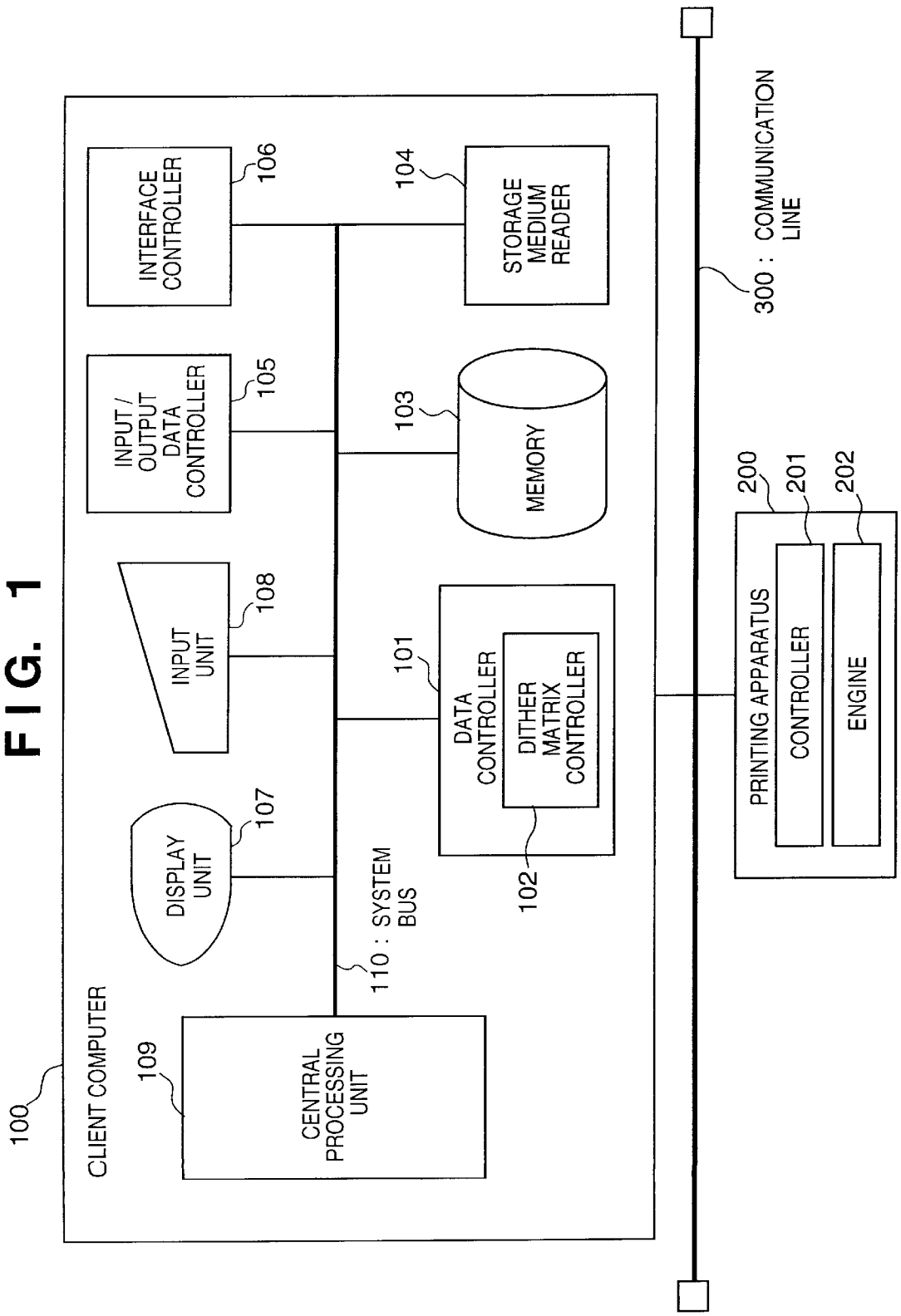
FIG. 1 is a block diagram illustrating the configuration of a printing system according to an embodiment of the present invention.

FIG. 1 is a block diagram showing the configuration of a printing system to which a data correction control scheme according to the present invention has been applied. The printing system is composed of a client computer 100, a printing apparatus 200 and a communication line (network) 300 connecting the host computer 100 and the printing apparatus 200.

The client computer 100 of this printing system includes a data controller 101, a dither matrix controller 102, a memory 103, a storage medium reader 104, an input/output controller 105, an interface controller 106, a display unit 107, an input unit 108, a central processing unit 109 for controlling overall operation of the client computer 100, and a system bus 110 connecting these components.

The printing apparatus 200, which includes a controller 201 and an engine 202, is a color printer capable of transporting paper in longitudinal and transverse directions.

The communication line 300 connecting the client computer 100 and printing apparatus 200 is an ordinary LAN or an IEEE 1394 or USB bidirectional serial interface or the like.

The display unit 107 of the client computer 100 is a display device such as a CRT display or liquid crystal display, and the input unit 108 is a keyboard and a pointing device such as mouse.

The dither matrix controller 102 according to this embodiment is a so-called printer driver, e.g., a raster driver for generating bilevel image data from print data that has been generated by an application or the like. The printer driver is a program which, in dependence upon the particular printing apparatus, manipulates print data generated by an application or the like between an operating system, which is resident in the client computer 100, and the printing apparatus 200, and controls the particular printing apparatus. The program is stored in the memory 103 or on a storage medium read by the storage medium reader 104.

The storage medium reader 104 is capable of reading programs such as a language monitor and printer driver, as well as image data and the like, stored on a recording medium such as a floppy disk, CD-ROM, ROM or magnetic tape.

The engine 202 in the printing apparatus 200 has an ordinary engine processing function, and the controller 201 has an ordinary control processing function.

[Printing apparatus construction]

Figure 2:
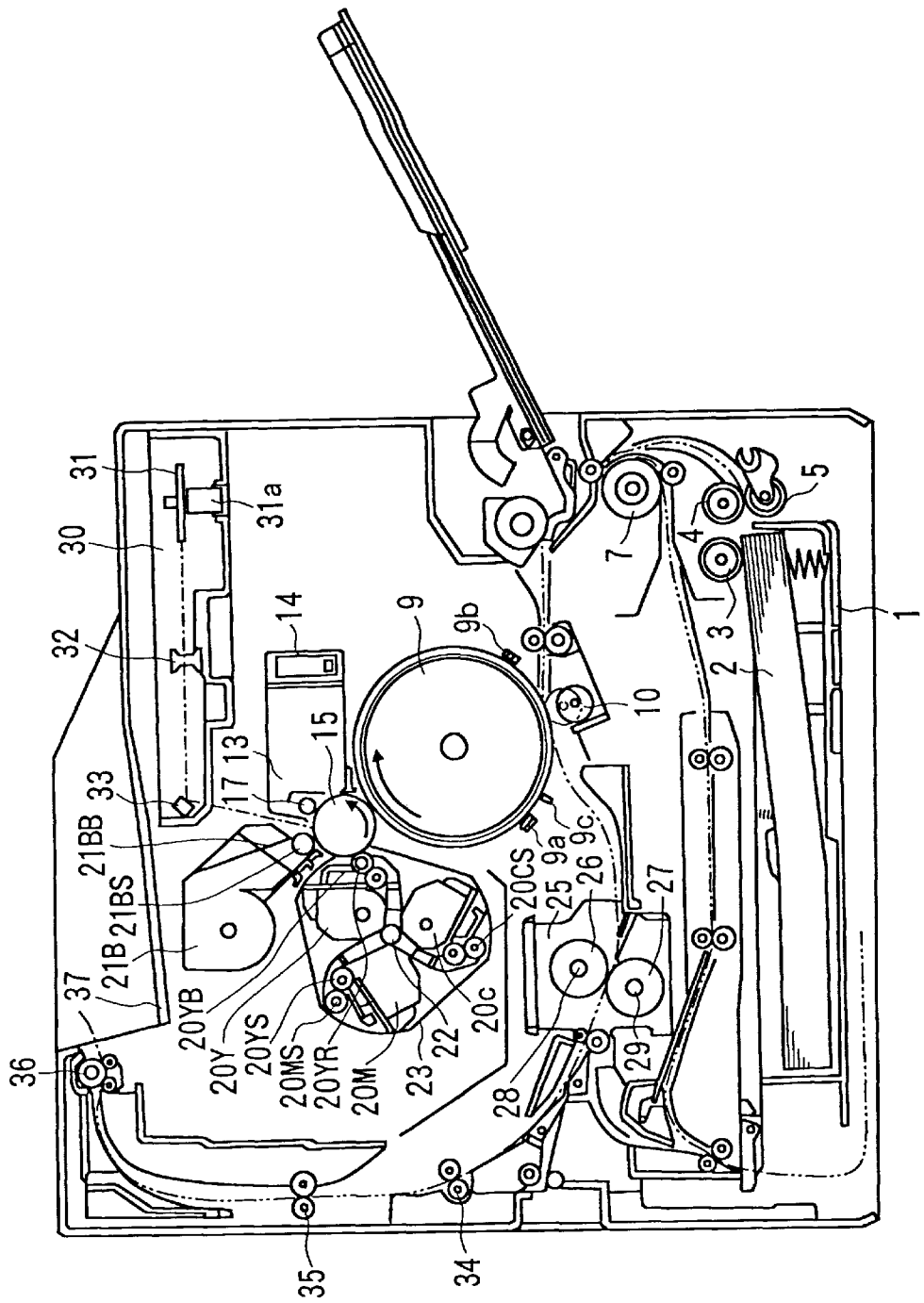
FIG. 2 is a sectional view showing the structure of a printing apparatus according to this embodiment.

The construction of a laser printer will be described as an example of the printing apparatus 200. FIG. 2 is a sectional view showing the structure of the printing apparatus 200 according to this embodiment.

As shown in FIG. 2, the printing apparatus is so adapted that a laser beam, which has been modulated by image data of color components obtained based upon print data entered from the line computer 100, is scanned across a photosensitive drum 15 by a polygon mirror 31 to form electrostatic latent images. Visible images are obtained by developing the latent images using toner and the visible images for all colors are transferred to an intermediate transfer body 9 to obtain a full-color visible image. The visible color image is transferred to and fixed on a transfer medium 2. The image forming section that performs the above-described control is constituted by a drum unit 13 having the photosensitive drum 15, a primary charging unit having a contact-type charging roller 17, a cleaning unit, a developing unit, the intermediate transfer body 9, a paper cassette 1, a feed unit including various rollers 3, 4, 5, 7, a transfer unit having a transfer roller 10 and a fixing unit 25.

The drum unit 13 is constructed by integrating the photosensitive drum (photoreceptor) 15 and a cleaner container 14 having a cleaning mechanism that serves also as the holder of the photosensitive drum 15. The drum unit 13 is supported on the printing apparatus proper in a freely attachable and detachable manner and is capable of being replaced with ease when the photosensitive drum 15 reaches the end of its service life. The photosensitive drum 15 includes an aluminum cylinder the peripheral surface of which is coated with an organic photoconductor layer, and is rotatably supported on the cleaner container 14. The photosensitive drum 15 is rotated by transmission of the driving force from a drive motor (not shown), the drive motor rotating the photosensitive drum 15 counterclockwise in conformity with the image forming operation. The laser beam transmitted from a scanner 30 is made to selectively expose the surface of the photosensitive drum 15, thereby forming the latent image. The scanner 30 has a motor 31a by which the polygon mirror 31 is rotated in synchronization with the horizontal synchronizing signal of the image signal, whereby the modulated laser beam is reflected to irradiate the photosensitive drum 15 via a lens 32 and reflecting mirror 33.

In order to make the electrostatic latent image a visible image, the developing unit has three color developing devices 20Y, 20M, 20C for developing the colors yellow (Y), magenta (M) and cyan (C), respectively, and a single black developing unit 21B for developing the color black (B). The color developing devices 20Y, 20M, 20C and black developing unit 21B are provided with sleeves 20YS, 20MS, 20CS and 21BS, respectively, and with coating blades 20YB, 20MB, 20CB and 21BB, respectively, which are in pressured contact with the outer peripheries of the respective sleeves 20YS, 20MS, 20CS, 20BS. The three color developing devices 20Y, 20M, 20C are further provided with coating rollers 20YR, 20MR, 20CR.

The black developer 21B is mounted on the printing apparatus 200 proper in a freely attachable and detachable manner. The color developing devices 20Y, 20M, 20C are mounted, in a freely attachable and detachable manner, on a developing rotary 23 which rotates about a rotary shaft 22.

The sleeve 21BS of the black developing device 21B is spaced away from the photosensitive drum 15 by a minute distance of, say, 300 $\mu$m. The black developing device 21B transports toner by an internally provided feed member and an electric charge is applied to the toner by frictional charging in such a manner that the coating blade 21BB will coat the outer periphery of the sleeve 21B, which rotates in the clockwise direction, with the toner. Further, by applying a developing bias to the sleeve 21BS, the toner on the photosensitive drum 15 is developed in conformity with the electrostatic latent image, whereby a visible image is formed on the photosensitive drum 15 by the black toner.

The three color developing devices 20Y, 20M, 20C rotate along with the developing rotary 23 at the time of image formation so that the prescribed ones of the sleeves 20YS, 20MS, 20CS are made to oppose the surface of the photosensitive drum 15 across minutely small distances of 300 $\mu$m. As a result, the prescribed ones of the color developing devices 20Y, 20M, 20C are stopped at a developing position relative to the photosensitive drum 15 so that a visible image is formed on the photosensitive drum 15.

When the color image is formed, a developing process is executed whereby the developing rotary 23 is rotated per each revolution of the intermediate transfer body 9 so that development is performed by the yellow developing device 20Y, magenta developing device 20M, cyan developing device 20C and black developing device 20Y, in the order mentioned. The intermediate transfer body 9 makes four revolutions to successively form visible images using the yellow, magenta, cyan and black toners. As a result, a full-color visible image is formed on the intermediate transfer body 9.

The intermediate transfer body 9 is adapted to contact the photosensitive drum 15 and rotates attendant upon rotation of the photosensitive drum 15. The intermediate transfer body 9 rotates clockwise at the time of formation of the color image and receives transfer of the four visible images from the photosensitive drum 15. At the time of image formation, the transfer roller 10, described later, contacts the intermediate transfer body 9 and transports the transfer medium 2 embraced by the intermediate transfer body 9 and the transfer roller 10, whereby the visible color images on the intermediate transfer body 9 are transferred to the transfer medium 2 simultaneously. Disposed about the periphery of the intermediate transfer body 9 are a TOP sensor 9a and an RS sensor 9b, which sense the position of the intermediate transfer body 9, and a density sensor 9c for sensing the density of the toner image that has been transferred to the intermediate transfer body 9.

The transfer roller 10 is spaced away from the intermediate transfer body 9 so that the visible color images will not be disturbed during the multiple transfer of the visible color images to the intermediate transfer body 9. After the four visible color images have been formed on the intermediate transfer body 9, the transfer roller 10 is moved upward to the position indicated by the phantom line by a cam member (not shown) in conformity with the timing at which the visible color images are transferred to the transfer medium 2. As a result, the transfer roller 10 is brought into pressured contact, at a prescribed force, with the intermediate transfer body 9 via the intermediary of the transfer medium 2. In addition, a bias voltage is applied so that the visible color images on the intermediate transfer body 9 are transferred to the transfer medium 2.

The fixing unit 25, which fixes the transferred visible color images while transporting the transfer medium 2, has a fixing roller 26 for heating the transfer medium 2, and a pressurizing roller 27 for bringing the transfer medium 2 into pressured contact with the fixing roller 26. The fixing roller 26 and the pressurizing roller 27 are formed to be hollow and internally incorporate heaters 28, 29, respectively. That is, the transfer medium 2 bearing the visible color images is transported, heated and pressurized by the fixing roller 26 and pressurizing roller 27, whereby the toners are fixed on the surface of the transfer medium 2.

The fixed transfer medium 2 is subsequently ejected to a discharge unit by discharge rollers 34, 35, 36, whereby the image forming operation is completed.

Cleaning means cleans residual toner from the photosensitive drum 15 and intermediate transfer body 9. Toner waste left after the visible toner images formed on the photosensitive drum 15 are transferred to the intermediate transfer body 9 or toner waste left after the four visible color images formed on the intermediate transfer body 9 are transferred to the transfer medium 2 is collected in the cleaner container 15.

[Dither matrix control]

Dither matrix control will now be described as a method of correcting data in this embodiment of the invention. In the description that follows, data is binarized in the client computer 100 and sent to the printing apparatus 200. A longitudinal-growth dither matrix used in binarization is rotated in dependence upon printing orientation and paper transport direction to form a dither matrix for the purpose of dealing with misregistration of color planes, and binarization is carried out using this dither matrix.

An overview of dither matrix control according to this embodiment will be described first.

Figure 3:
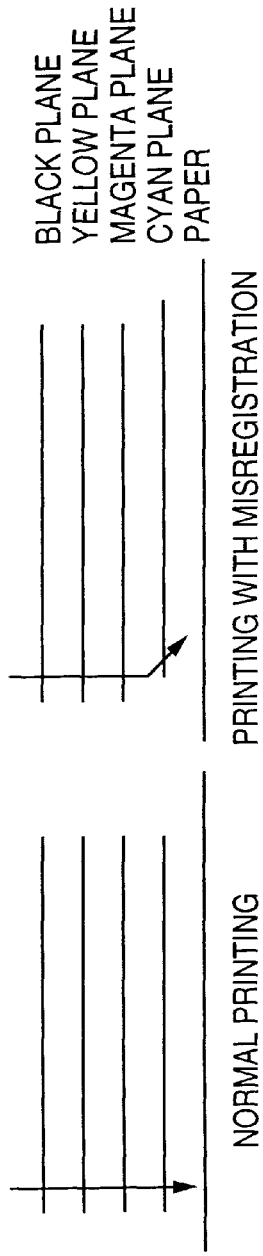
FIG. 3 is a diagram showing an example of misregistration involving C, M, Y and K planes.

FIG. 3 is a diagram showing an example of misregistration involving C, M, Y and K planes. Starting from the left, cyan, magenta, yellow and black planes are shown at the top of FIG. 3. The engine 202 in the printing apparatus 200 prints each of the planes on the same sheet of paper, as shown at the bottom of FIG. 2, whereby an output image is formed on the paper. The order in which the planes are printed in FIG. 3 is only one example, and it goes without saying that the planes may be printed in a different order. Printing shown at the bottom left of FIG. 3 is normal printing and is the result of printing processing in which the planes have been superposed correctly. Printing shown at the bottom right of FIG. 3 is printing in which misregistration has occurred. Here the cyan plane has been shifted to the right in printing, causing the cyan plane to be registered incorrectly with respect to the other planes.

Figure 4:
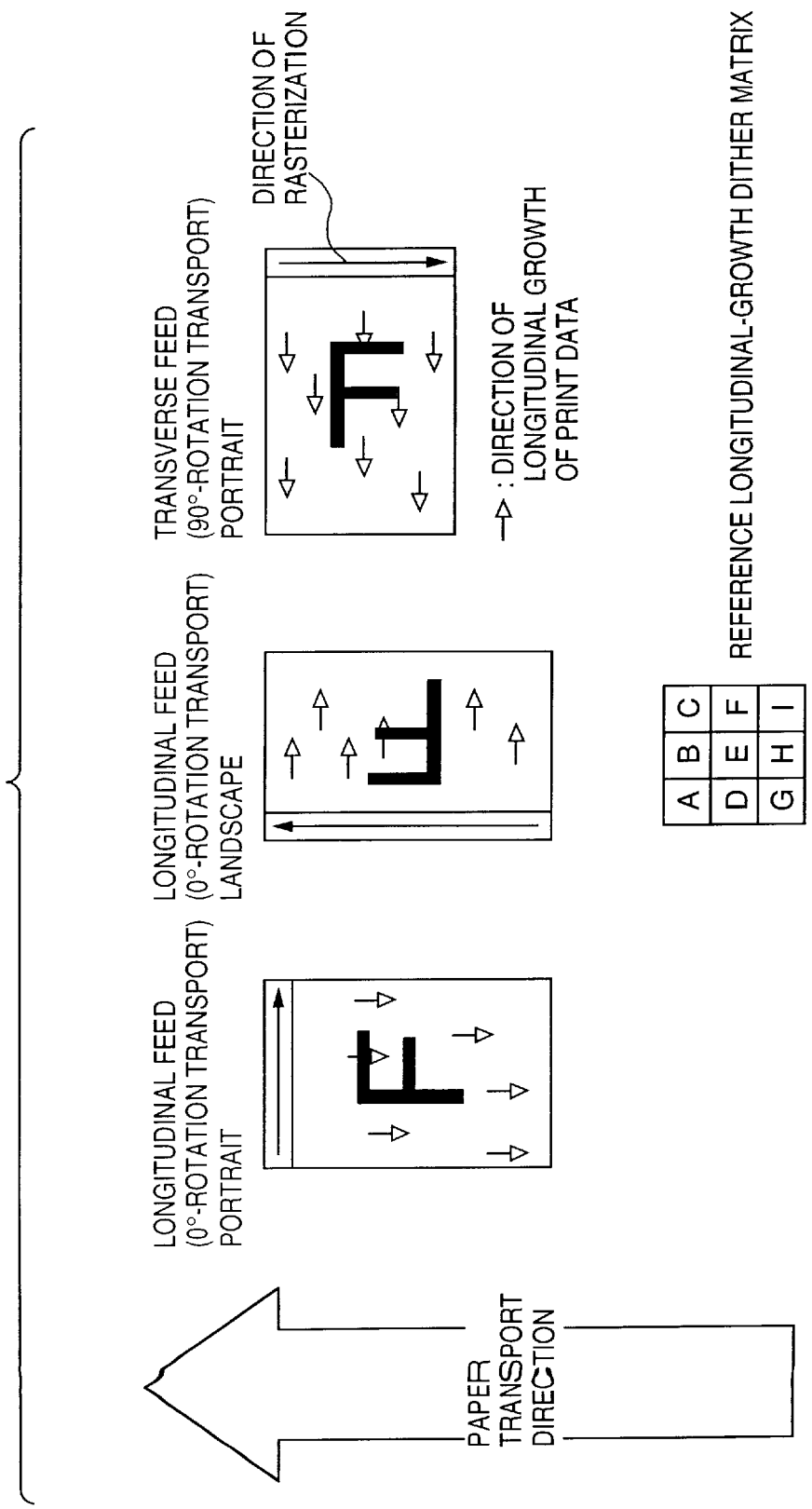
FIG. 4 is a diagram showing a prior-art example of result of output in a case where use is made of a unique longitudinal-growth dither matrix without taking printing orientation and paper transport direction into account.

FIG. 4 is a diagram showing a prior-art example of result of output in a case where use is made of a unique longitudinal-growth dither matrix without taking printing orientation (portrait or landscape) and paper transport direction (longitudinal or transverse) into account. FIG. 4 shows an example in which, when misregistration of planes occurs as the result of printing processing of the kind indicated at the lower right of FIG. 3, binarization processing based upon a reference longitudinal-growth dither matrix shown at the bottom of FIG. 4 is executed so that an image at an appropriate position will grow longitudinally (downward), as indicated by the printing of the character "F" on the left side of FIG. 4, thereby making it possible to prevent misregistration.

However, if processing using a reference longitudinal-growth dither matrix is applied in a manner similar to that of the case shown in FIG. 3 to the examples indicating printing of the character "F" at the center and right sides of FIG. 4, the image grows (to the left or right) in a direction orthogonal to the paper transport direction. Consequently, such processing is not effective in dealing with misregistration.

Figure 5:
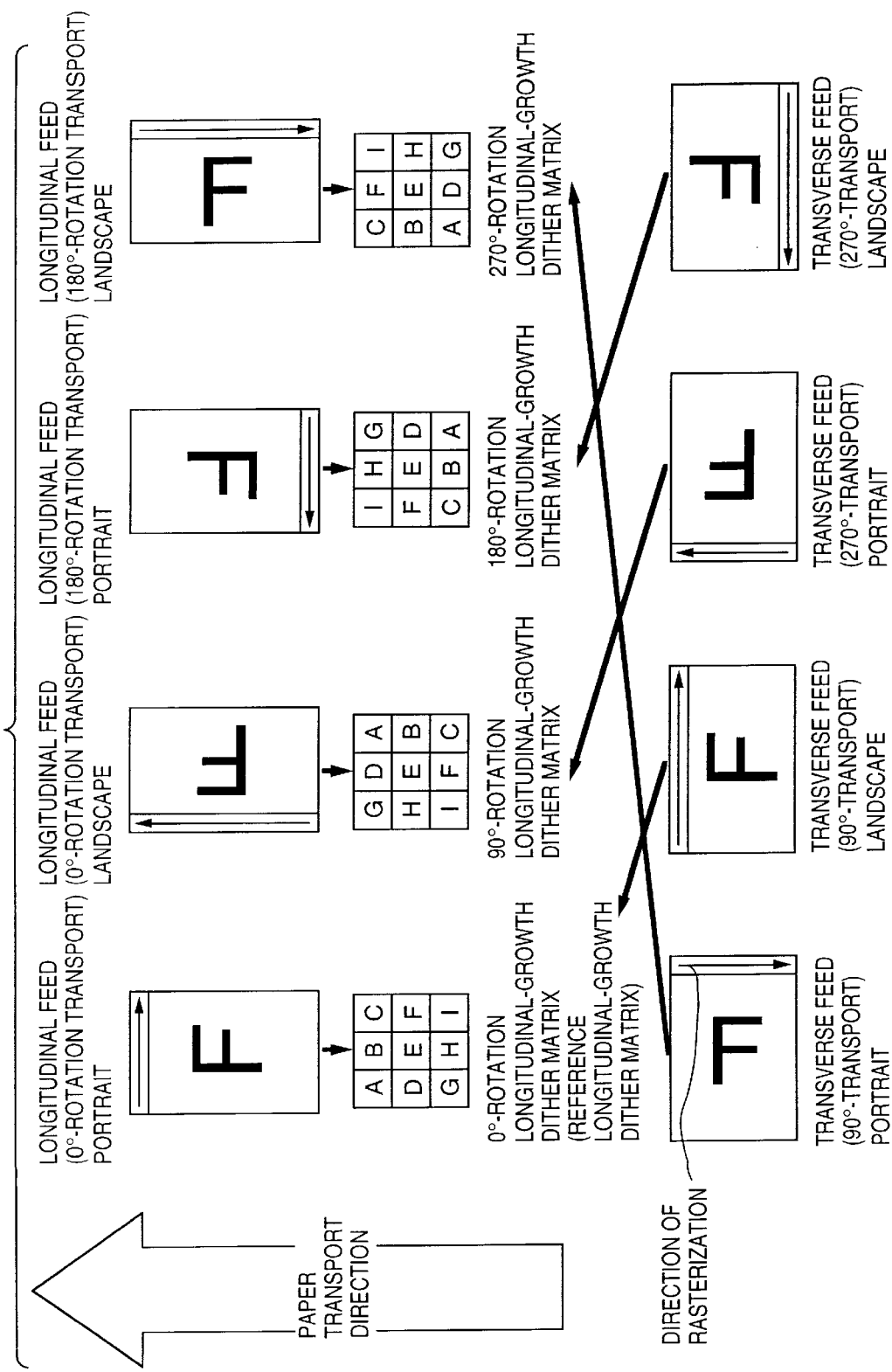
FIG. 5 is a diagram illustrating processing for forming a longitudinal-growth dither matrix that takes printing orientation and paper transport direction into account in accordance with this embodiment of the invention.

According to this embodiment, therefore, a longitudinal-growth dither matrix is formed in dependence upon printing orientation and paper transport direction. FIG. 5 is a diagram illustrating processing for forming a longitudinal-growth dither matrix that takes printing orientation and paper transport direction into account in accordance with this embodiment of the invention. Assume that the reference paper transport direction of the printing apparatus 200 is the direction of longitudinal feed, as indicated on the left side of FIG. 5, and that the reference dither matrix is the 3×3 reference dither matrix in FIG. 5. Misregistration can be prevented by executing binarization processing upon applying rotation processing to a reference dither matrix taking into consideration the orientation of printing and paper transport direction actually expected.

It goes without saying that the rasterizing directions shown in FIGS. 4 and 5 do not impose a limitation upon the invention. Further, the above-mentioned misregistration, dither matrix, longitudinal-growth dither matrix, CMYK, binarization and rasterization are well known to those having ordinary skill in the art and need not be described here.

[Details of control procedure]

Figure 6:
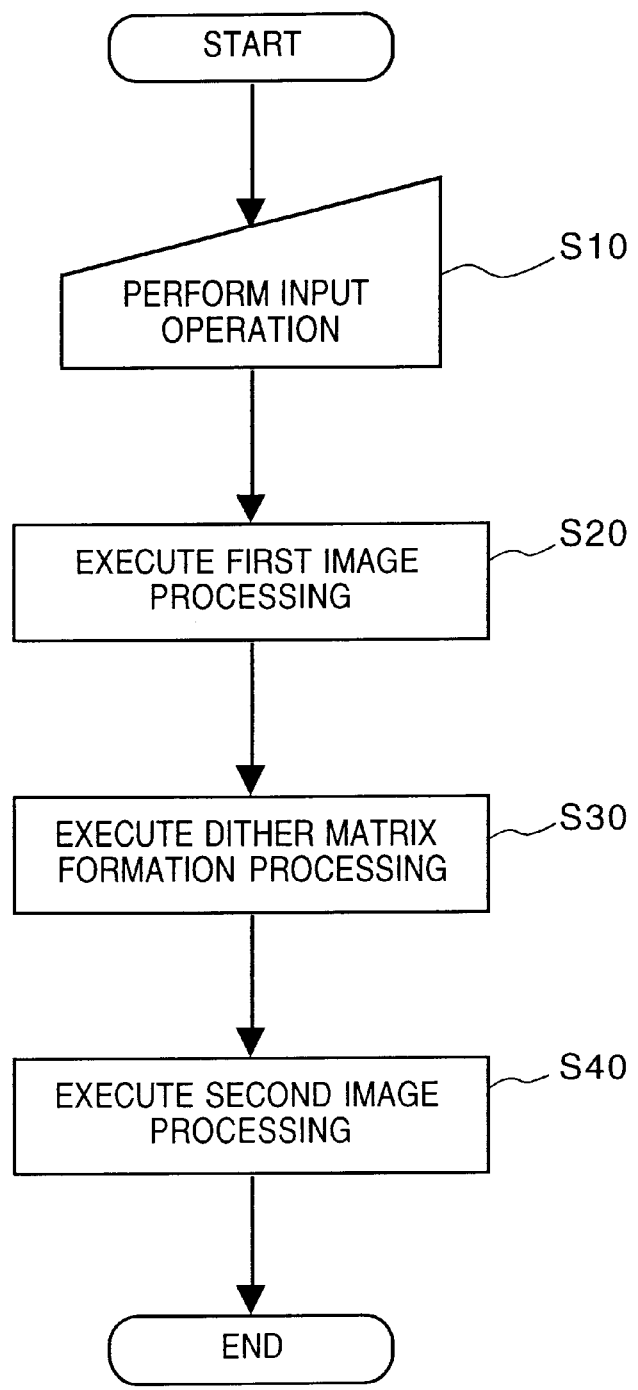
FIG. 6 is a flowchart illustrating dither matrix control in a client computer.

Dither matrix control in this embodiment will now be described in detail. FIG. 6 is a flowchart illustrating dither matrix control in the client computer 100, and FIG. 7 is a flowchart illustrating the details of dither matrix formation processing shown in FIG. 6.

When an input operation is performed using the input unit 108 and display unit 107 of the client computer 100 to command the printing apparatus 200 to perform printing (step S10), first image processing such as initialization and data conversion (conversion from RGB to CMYK) is executed as ordinary printing processing in the data controller 101 (step S20). Next, the dither matrix controller 102 starts processing in accordance with the flowchart of FIG. 7 as dither matrix formation processing (step S30).

Reference paper transport direction information in the printing apparatus 200 is acquired (step S100). In this embodiment, a case in which paper is discharged with its long edge parallel to the transport direction, as shown in FIG. 5, is taken as the reference (this includes a case where the direction in which print processing is performed by the engine 202 also is the same). This paper transport is referred to as 0°-rotation transport. Cases in which the paper is discharged upon being rotated by 90°, 180° and 270° are referred to as 90°-rotation transport, 180°-rotation transport and 270°-rotation transport, respectively.

Next, reference longitudinal-growth dither matrix information in the printing apparatus 200 is acquired (step S101). According to this embodiment, a longitudinal-growth dither matrix premised on a case where the paper transport direction is the longitudinal feed direction and the printing orientation is the portrait orientation is adopted as the reference longitudinal-growth dither matrix.

The paper transport direction information and reference dither matrix information obtained at steps S100 and S101 can be obtained by various methods. For example, the information may be obtained dynamically from the printing apparatus 200 by utilizing a bidirectional function, or it may be obtained from the memory 103 or storage medium reader 104 in advance. The information may also be retained or acquired statically by the dither matrix controller 102.

Next, information relating to the actual printing orientation is acquired (step S102). Here printing orientation means the portrait or landscape orientation set at will by an application from the display unit 107 and input unit 108 or by a user interface provided by the data controller 101 and dither matrix controller 102. Information relating to the paper transport direction is acquired (step S103). Here the transport direction means a direction set at will by an application from the display unit 107 and input unit 108 or by a user interface provided by the data controller 101 and dither matrix controller 102, a direction obtained dynamically from the printing apparatus 200 by utilizing a bidirectional function, or the orientation in which paper is discharged from the printing apparatus, which orientation is acquired from the memory 103 or storage medium reader 104 in advance.

Next, it is determined, based upon the acquired printing orientation information, whether the printing orientation is the portrait or landscape orientation (step S104). If the printing orientation is the portrait orientation, then the process for forming the dither matrix is decided (step S105) upon taking into account the paper transport direction that was acquired at step S103. In a case where the paper transport direction is judged to be "transverse feed (270°-transport) portrait" at the bottom of FIG. 5, a 0°-rotation longitudinal-growth dither matrix is rotated 90° to form the proper longitudinal-growth dither matrix (step S106).

In a case where the paper transport direction is judged to be "longitudinal feed (180°-rotation transport) portrait" at the top of FIG. 5, the 0°-rotation longitudinal-growth dither matrix is rotated 180° to form the proper longitudinal-growth dither matrix (step S107).

In a case where the paper transport direction is judged to be "transverse feed (90°-transport) portrait" at the bottom of FIG. 5, the 0°-rotation longitudinal-growth dither matrix is rotated 270° to form the proper longitudinal-growth dither matrix (step S108).

In a case where the paper transport direction is judged to be "longitudinal feed (0°-rotation transport) portrait" at the top of FIG. 5, a longitudinal-growth dither matrix is not formed and the 0°-rotation longitudinal-growth dither matrix serving as the reference is used as is.

If the printing orientation is found to be the landscape orientation at step S104, then the process for forming the longitudinal-growth dither matrix is decided (step S109) upon taking into account the paper transport direction that was acquired at step S103. In a case where the paper transport direction is judged to be "longitudinal feed (0°-rotation transport) landscape" at the top of FIG. 5, the 0°-rotation longitudinal-growth dither matrix is rotated 90° to form the proper longitudinal-growth dither matrix (step S106).

In a case where the paper transport direction is judged to be "transverse feed (90°-transport) landscape" at the bottom of FIG. 5, a longitudinal-growth dither matrix is not formed and the 0°-rotation longitudinal-growth dither matrix serving as the reference is used as is.

In a case where the paper transport direction is judged to be "longitudinal feed (180°-rotation transport) landscape" at the top of FIG. 5, the 0°-rotation longitudinal-growth dither matrix is rotated 270° to form the proper longitudinal-growth dither matrix (step S108).

In a case where the paper transport direction is judged to be "transverse feed (270°-transport) landscape" at the bottom of FIG. 5, the 0°-rotation longitudinal-growth dither matrix is rotated 180° to form the proper longitudinal-growth dither matrix (step S107).

This completes the dither matrix formation processing of step S30 in FIG. 6. Second image processing such as ordinary binarization processing and processing for outputting a signal to the printing apparatus is then performed using the longitudinal-growth dither matrix formed (step S40 in FIG. 6), after which printing processing is terminated.

Thus, a client computer is provided with a dither matrix controller for controlling a dither matrix (the aforementioned longitudinal-growth dither matrix), which is for dealing with misregistration of color planes, particularly when binarization processing is executed in control of data. The present invention provides a printing control method for performing printing using a color printing apparatus connected to the client computer. The control method includes a step of acquiring the reference paper transport direction of the printing apparatus and a reference longitudinal-growth dither matrix, a step of acquiring information relating to orientation of print data and information relating to paper transport direction of the printing apparatus, and a step of forming a proper longitudinal-growth dither matrix based upon this information. An apparatus for practicing this method is provided, as well as a storage medium, which can be read by the client computer, storing the program codes of the printing control method. This makes it possible to form and output a high-quality output image regardless of the print data orientation and paper transport direction.

It should be noted that the present invention can be applied to wide-ranging computer systems having the following modes of connection in addition to the mode of connection shown in FIG. 1, in which a client computer connected to a communication line causes printing to be performed by a printing apparatus:

(1) a mode of connection in which the printing apparatus is connected to a client computer locally; and (2) a mode of connection in which the printing apparatus, rather than being connected to a communication line directly, is connected to a server computer locally.

Further, according to the present invention, the dither matrix formation processing at step S30 in FIG. 6 may be executed before the first image processing of step S20.

In this embodiment described above, a client computer is provided with a longitudinal-growth dither matrix controller for controlling a dither matrix, which is for dealing with misregistration of color planes, thereby making it possible to form and output a high-quality output image using a color printing apparatus. However, it is also possible to adopt an arrangement in which the controller of the color printing apparatus is provided with the longitudinal-growth dither matrix control function.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with this embodiment, as described above, high-quality printing can be carried out by forming a dither matrix, which is for dealing with misregistration of color planes, in dependence upon printing orientation and paper transport direction, and using this dither matrix to execute binarization processing.

As many apparently widely different embodiments of the present invention can be made without departing from the spirit and scope thereof, it is to be understood that the invention is not limited to the specific embodiments thereof except as defined in the appended claims.

What is claimed is:

1. A printing system composed of a computer and a printing apparatus connected via a communication line, wherein said computer includes:

forming means for forming a dither matrix, which is employed in binarization processing to deal with misregistration of color planes, in dependence upon printing orientation and paper transport direction; and binarization means for binarizing print data using the dither matrix formed by said forming means;

said printing apparatus printing print data that has been corrected, by said computer, for misregistration of color planes.

2. The system according to claim 1, wherein said forming means forms said dither matrix by rotating a reference dither matrix through a predetermined angle in dependence upon the printing orientation and paper transport direction.

3. A printing apparatus comprising:

forming means for forming a dither matrix, which is employed in binarization processing to deal with misregistration of color planes, in dependence upon printing orientation and paper transport direction;

binarization means for binarizing print data using the dither matrix formed by said forming means; and printing means for printing print data that has been binarized by said binarization means.

4. The apparatus according to claim 3, wherein said forming means forms said dither matrix by rotating a reference dither matrix through a predetermined angle in dependence upon the printing orientation and paper transport direction.

5. A printing control method comprising:

a forming step of forming a dither matrix, which is employed in binarization processing to deal with misregistration of color planes, in dependence upon printing orientation and paper transport direction;

a binarization step of binarizing print data using the dither matrix formed by said forming step; and a printing control step of controlling printing of print data that has been binarized by the binarization step.

6. The method according to claim 5, wherein said forming step forms said dither matrix by rotating a reference dither matrix through a predetermined angle in dependence upon the printing orientation and paper transport direction.

7. A computer readable storage medium storing program codes for printing control, comprising:

code of a forming step of forming a dither matrix, which is employed in binarization processing to deal with misregistration of color planes, in dependence upon printing orientation and paper transport direction;

code of a binarization step of binarizing print data using the dither matrix that has been formed; and code of a printing control step of controlling printing of print data that has been binarized.

* * * * *